United States Patent
Leigh

(10) Patent No.: US 11,323,062 B2
(45) Date of Patent: May 3, 2022

(54) POWER GENERATION AND CELL STORAGE APPARATUS

(71) Applicant: Grafmarine, Altrincham (GB)

(72) Inventor: Martin Leigh, Altrincham (GB)

(73) Assignee: GRAFMARINE, Altrincham (GB)

(*) Notice: Subject to any disclaimer, the term of this patent is extended or adjusted under 35 U.S.C. 154(b) by 259 days.

(21) Appl. No.: 16/063,187

(22) PCT Filed: Nov. 25, 2016

(86) PCT No.: PCT/GB2016/053722
§ 371 (c)(1),
(2) Date: Jun. 15, 2018

(87) PCT Pub. No.: WO2017/103563
PCT Pub. Date: Jun. 22, 2017

(65) Prior Publication Data
US 2020/0144955 A1 May 7, 2020

(30) Foreign Application Priority Data
Dec. 15, 2015 (GB) .................................... 1522070

(51) Int. Cl.
*B60L 8/00* (2006.01)
*H02S 10/20* (2014.01)
(Continued)

(52) U.S. Cl.
CPC .............. *H02S 10/20* (2014.12); *B60L 8/003* (2013.01); *B60L 50/60* (2019.02); *B63H 19/00* (2013.01);
(Continued)

(58) Field of Classification Search
CPC ...... B60L 50/60; B60L 8/003; B60L 2200/32; B63H 19/00; H01L 27/142; H01L 31/042;
(Continued)

(56) References Cited

U.S. PATENT DOCUMENTS 3,982,963 A    9/1976  Mahoney
4,740,431 A *  4/1988  Little .................. H01M 10/465
                                                136/244
(Continued)

FOREIGN PATENT DOCUMENTS

CN    202 405 286 U    8/2012
JP     11200575 A  *   7/1999
(Continued)

OTHER PUBLICATIONS

International Search Report for PCT/GB2016/053722 dated Mar. 2, 2017; 4 pages.

*Primary Examiner* — Daniel Cavallari
*Assistant Examiner* — Brian K Baxter
(74) *Attorney, Agent, or Firm* — Schwabe, Williamson & Wyatt, PC

(57) ABSTRACT

The present invention relates to an apparatus and method for the localized capture, storage and specialized use of power generated from natural sources, such as solar power or hydropower. The apparatus can be used, for example, on a deck or a side of a marine vessel, or on a land-based structure, where there is a requirement for managed power generation and storage.

12 Claims, 5 Drawing Sheets

(51) Int. Cl.
*H02S 40/34* (2014.01)
*H02S 40/38* (2014.01)
*B60L 50/60* (2019.01)
*B63H 19/00* (2006.01)
*H01M 10/46* (2006.01)
*H01M 16/00* (2006.01)
*H02S 20/00* (2014.01)
*H02S 30/00* (2014.01)

(52) U.S. Cl.
CPC ....... *H01M 10/465* (2013.01); *H01M 16/006* (2013.01); *H02S 20/00* (2013.01); *H02S 30/00* (2013.01); *H02S 40/34* (2014.12); *H02S 40/38* (2014.12); *B60L 2200/32* (2013.01); *H01M 2220/20* (2013.01); *H01M 2250/20* (2013.01); *H01M 2250/40* (2013.01)

(58) Field of Classification Search
CPC ............ H01M 10/465; H01M 16/006; H01M 2220/20; H01M 2250/20; H01M 2250/40; H02S 10/20; H02S 20/00; H02S 20/20; H02S 30/00; H02S 40/30; H02S 40/34; H02S 40/38; Y02E 10/50
USPC .......................................................... 307/72
See application file for complete search history.

(56) References Cited

U.S. PATENT DOCUMENTS

| | | | | |
|---|---|---|---|---|
| 6,051,774 A | * | 4/2000 | Yoshida | B32B 3/12 136/244 |
| 8,907,202 B1 | * | 12/2014 | Brusaw | H01L 31/0488 136/244 |
| 2002/0153038 A1 | * | 10/2002 | Umemoto | H01L 31/0488 136/251 |
| 2009/0181247 A1 | * | 7/2009 | Lynn | H01L 31/0384 428/339 |
| 2010/0018568 A1 | * | 1/2010 | Nakata | H01L 31/02008 136/246 |
| 2010/0180523 A1 | * | 7/2010 | Lena | H02S 20/25 52/173.3 |
| 2011/0232761 A1 | * | 9/2011 | Lomasney | H01M 10/465 136/262 |
| 2012/0222719 A1 | * | 9/2012 | Utsunomiya | H01L 31/0504 136/244 |
| 2014/0130851 A1 | * | 5/2014 | Osamura | B32B 25/08 136/251 |
| 2014/0272623 A1 | * | 9/2014 | Jennings | B01J 27/0576 429/411 |
| 2015/0013768 A1 | * | 1/2015 | Odoi | C08F 210/16 136/259 |
| 2015/0159063 A1 | * | 6/2015 | Yamada | C08G 18/792 525/101 |
| 2016/0049900 A1 | * | 2/2016 | Goldberg | F24S 40/00 136/251 |
| 2016/0169257 A1 | * | 6/2016 | Ninaber | F16B 5/0084 403/168 |
| 2017/0045216 A1 | * | 2/2017 | Chung | H02G 13/40 |
| 2017/0104446 A1 | * | 4/2017 | Sakabe | H02S 40/425 |
| 2017/0327720 A1 | * | 11/2017 | Takeda | C09J 167/06 |

FOREIGN PATENT DOCUMENTS

| | | | |
|---|---|---|---|
| JP | H11 200575 A | 7/1999 | |
| KR | 101 295 625 B1 | 8/2013 | |
| WO | 2005/081326 A1 | 9/2005 | |
| WO | 2009/071956 A2 | 6/2009 | |
| WO | WO-2009071956 A2 * | 6/2009 | ........... H01L 31/052 |

* cited by examiner

POWER GENERATION AND CELL STORAGE APPARATUS

CROSS-REFERENCE TO RELATED APPLICATION

The present application is a national phase entry under 35 U.S.C. § 371 of International Application No. PCT/GB2016/053722, filed Nov. 25, 2016, entitled "POWER GENERATION AND CELL STORAGE APPARATUS," which designates the United States of America, which claims priority to GB Application No. 1522070.0, filed Dec. 15, 2015, the entire disclosures of which are hereby incorporated by reference in their entireties and for all purposes.

The present invention relates to an apparatus and method for the localized capture, storage and specialized use of power generated from natural sources, such as solar power or hydropower. The apparatus can be used, for example, on a deck or a side of a marine vessel, or on a land-based structure, where there is a requirement for power generation and storage.

BACKGROUND OF THE INVENTION

Existing power capture and storage apparatuses, such as solar panels, that are currently in use, particularly in environments such as marine environments, are adapted from solid structure systems, such as those which contain glass, which are rigid and unsuitable for use on contoured or flexing structures as well as non-localised storage of power away from where power is required.

However, not all surfaces have structures that are fixed and rigid. Some surfaces, for example those on boats and ships when in the water, are in a constant state of motion and are constantly moving and flexing with the movement of the water underneath them. Existing rigid power capture and storage apparatuses are not suitable for such surfaces. The present invention addresses these needs.

Therefore, in accordance with the invention, there is provided an apparatus for the capture and storage of power, the apparatus comprising:
i) a first layer acting as a protective layer, comprising one or more protrusions that enable two or more apparatuses to interconnect with each other;
ii) a second layer engaged with the first layer, the second layer comprising a device that is able to generate power from exposure to its environment;
iii) a third layer engaged with the second layer, the third layer comprising a power storage facility; and
iv) a fourth layer engaged with the third layer, the fourth layer comprising a power grid which enables power to be transferred between interconnected apparatuses;
wherein the layers are secured together using a connecting member inserted through an opening in each layer.

The fourth layer typically comprises a power grid. The power grid section is typically located underneath the third layer, and provides a grid enabling power to be transferred from apparatus to apparatus in an array of apparatuses. It is the underside of this fourth layer that is typically intended to be adjacent the surface to which the apparatus is attached when in operation.

The grid construct structure comprises a conductive material, such as a conductive matting, which allows the draw and transfer of power between the apparatuses. The final element of this grid is a sensor housed in the central connecting member, which monitors through sensors (which may be graphene enhanced) the levels of energy stored and the use of localized energy as a complete grid.

This connecting member sits as part of a secured and interlinked apparatus to the surface to which the apparatus is fixed, that serves to create power distribution across part, or all, of an area where the apparatus is fixed.

The apparatus may be attached to the surface by any suitable means, which will depend upon the nature and material of any given surface. Suitable means may include, but are not limited to, adhesives, bolts or screws.

The third layer comprises a battery as the power storage facility for storing the power that is generated by the device of the second layer. Typically, the battery component contains an amount of graphene or a derivative thereof. If the battery is a lithium-containing battery, the graphene acts as a catalyst to 'enhance' lithium in the battery, by accelerating the speed at which the battery is charged, while still maintaining the long battery life of the lithium battery. It can also work as a superconductor providing rapid charging; other battery technologies may be used where this is unsuitable.

This layer provides management of power via sensor and electronic management as well as Bluetooth beacon technology, which is able to provide real time managed control of the power that is generated and stored.

The battery in the third layer is a receptacle to store power generated by the second layer. The battery is typically split into two technologies, using graphene enhancements in semi-conductors, which provides very quick charging for small devices. The majority of the third layer is typically constructed of an impact resistant polymer with internal chambers to house to a mix of lithium and graphene optimized battery cells, creating both instant power and slower charge release electrical energy for lighting systems and other equipment.

The graphene component may be in the form of a coating on any metal that is in the battery manufactured to the purest and highest quality through the newest manufactured processes in a form that one skilled in the art would appreciate as being suitable for the purpose. The graphene component may by up to 100% graphene, or it may be provided in the form of a mixture with one or more other materials, such as with a mixture with one or more complimentary materials appropriate to what it has to achieve as a component.

The third layer can also typically comprise an LED (light emitting diode) strip light or a power indicator, which indicates how much power is actually being stored in the third layer at any given time. The amount of power being stored in the third layer may also be indicated by one or more LED lights, which may be of various different colours, for example red, yellow and green, to provide an indication of much power is actually being stored in the third layer. By way of example, if no LED indicators are lit, then there is no or minimal power stored; if only one light (e.g. a red light) is lit then there is a little power stored, and so on. The more lights that are lit, the more power there is stored in the first layer.

The third layer may also comprise one or more LED lights, of any desired colour, which can be typically positioned on one or more of the sides of the third layer, and are visible when the apparatus is in operation, and provide a source of lighting as a part of the apparatus.

It is also possible to view and monitor how much power is being generated and stored in any given apparatus remotely via an app, as the apparatuses can transmit this information via wireless and bluetooth beacon technology. This enables a person to evaluate which apparatuses in which positions are working at a desired level, or which are not so optimally positioned to generate sufficient power. The entire laid apparatus can be adjusted and optimised individually to increase power by improved positioning of components to increase monitored performance.

The second layer may be any device that is able to generate power from exposure to its environment. For example, such devices include, but are not limited to, a solar panel, a hydrogen fuel cell that can generate power from water.

If the second layer is to generate solar power, it will contain embedded solar cells, that are typically integrated into the upper surface of the layer to maximize coverage of the solar cells extend down the layer allowing maximum exposure and energy capture for the sun.

The underside of the second layer, i.e. the side which is in contact with the third layer, acts a conduit for the transfer of power into the battery section in the third layer, positioned underneath the second layer. This underside is typically waterproof and sealed and contains highly conductive properties to transfer the solar generated power quickly and efficiently into the battery layer using graphene and/or other advanced materials. Some of the generated power may be used as a 'step-up' to enhance energy transfer to improve transfer and energy harvesting levels and this may be used in the creation of hydrogen.

In order to provide the desired highly conductive properties, any suitable materials may be used that would be apparent to a person skilled in the art. Such materials may include, but are not limited to, a mixture of copper and graphene, for example.

The first layer is typically the surface which is uppermost in the apparatus of the invention, and which will be exposed most to the elements. It also acts as a protective layer for the second and third layers, while simultaneously allowing the second layer to be exposed to the source of the power that is to be generated by the device of the second layer, such as the sun or water. The first layer must therefore comprise a material that is able to allow the second layer to be exposed to the source of the power, such as the sun, water. Also, the first typically comprises a hardened polymer, such as a silicon-based polymer, or a resilient transparent material. This is because the first layer is the layer that is directly exposed to the elements and human contact, and if the apparatus is to be used on the deck of a boat or a ship, it will need to be sufficiently sturdy to be walked upon without fracturing and breaking, while also being relatively lightweight, durable, and resistant to scratching and extreme temperature conditions. The first layer may also be integrated into more power generating devices, such as a solar cell.

The first layer and/or the second layer also comprise one or more protrusions extending from one or more of its edges, which enable two or more apparatuses to interconnect with each other. When a plurality of apparatuses of the invention are positioned adjacent each other, the protrusions on any given apparatus are designed to extend underneath an adjacent apparatus in order to help the adjacent apparatuses interconnect with each other. The one or more protrusions each typically comprise a semi-circular recess at the end thereof; these one or more semi-circular recesses are designed to engage with and extend halfway around the connecting members of the adjacent apparatuses, such that two such protrusions and recesses of neighbouring apparatuses will engage with and completely surround the connecting member of any given apparatus in an array. The semi-circular recesses have substantially the same dimensions as the connecting member, in order that they engage with each other as tightly as possible.

The protrusions may be made of a conductive matting material, which allows the draw and transfer of power between individual apparatuses when interconnected in an array, thus effectively forming a power grid. As the conductive matting material, any suitable materials may be used that would be apparent to a person skilled in the art. Such materials may include, but are not limited to, a mixture of copper, or similar conductive metal, and graphene.

Such protrusions may also be found on the second layer, and are positioned underneath the corresponding protrusions on the first layer.

Each layer comprises an opening therein which extends through each layer. The opening is typically positioned centrally within the layer for symmetry. The connecting member is typically a pin, a screw, or a spike, or any other member that is suitable to be inserted through an opening in each layer in order to aid in holding the three layers in place together. Additionally, if necessary, the connecting member is able to be used to hold the apparatus in position on the surface to which it is being attached.

The connecting member may further be adapted to act as a light source or power source, containing a light source in the visible end thereof, or as a power source for accessories such as totem LED lights, which can act as normal or emergency lighting.

Further, the connecting member may contain a sensor, which can be used to monitor, through graphene enhanced sensors, the levels of energy stored and the use of localized energy.

According to one embodiment of the invention, the connecting member may further be affixed to a base layer, which is positioned between the third layer and the surface the apparatus is to be attached to. The connecting member is affixed to a central point of the base layer, and the third, second and first layers are sequentially placed on top of the base layer to form the apparatus.

Typically, a plurality of the apparatuses of the invention is used in conjunction with each other in a flexible array. This may be from as few as two to any number above that. The apparatuses may be used anywhere that has a requirement for power generation and storage. One potential location is on a marine vessel, such as a boat or ship. The apparatuses may be installed on the deck of the vessel, or on the side of the vessel, or on a cabin roof, or anywhere else which will be exposed to the necessary elements which might be considered suitable. If the second layer comprises a solar panel, then any location where the apparatus would be exposed to the sun would be suitable for it to be located; similarly, any device capable of harnessing water for hydrogen generation would ideally be located where it can be exposed to a suitable water source. If the second layer comprises a hydrogen fuel cell, then the apparatus is more typically located on the side of the vessel, and more typically near to the water line and a source of flowing water. In the hydrogen fuel cell, a membrane splits the water into hydrogen and oxygen atoms, releasing the oxygen and providing storage for hydrogen directly into sealed areas of a fuel cell or internal fuel cells. The inclusion of ballast areas which contain quantities of water within a vessel may be considered for small quantities of hydropower generation and localized storage.

In an array, not every apparatus needs to be attached to the surface the apparatus is to cover, as this may render the array as too rigid and inflexible for its purpose. Rather, only select apparatuses may be attached to the surface in question, allowing the overall structure of the array to remain flexible.

The apparatus of the invention is typically in the form of a tile or panel, which is removable, and which is able to lie substantially flat against a surface to which it is to be attached.

The apparatus of the invention may be of any shape or dimension desired, to fit in with the area it is located within, or for simple aesthetics. It is typically of a recognised geometric shape, such as a hexagon, square or rectangle, which allow for the greatest degree of interconnection and surface coverage using the apparatuses; however, it may also be in an irregular shape which still allows for an effective coverage of the surface the apparatus is to be attached to.

Overall, the present invention allows power to be generated, stored and used locally in an efficient and effective battery-based power grid apparatus that can be bespoke to specific requirements. One way the invention can be bespoke is through the use of removable tiles or panels comprising the apparatus of the invention. The tiles or panels can be changed and updated to maximise energy capture depending on the specific needs of a user, and the specific structure they are to be used on, or the specific with power use or storage requirements. This system also allows for future enhancements in technology to be quickly introduced and integrated into the existing and may be upgraded apparatus.

According to another embodiment of the invention, there is provided a marine vessel comprising one or more apparatuses as defined hereinabove.

According to another embodiment of the invention, there is provided a use of one or more apparatuses apparatus as defined hereinabove in the generation and storage of power.

The present invention also provides a method of generating and storing power comprising employing one or more apparatuses apparatus as defined hereinabove.

The invention will now be described further by way of example with reference to the following figures which are intended to be illustrative only and in no way limiting upon the scope of the invention.

Figure 1:
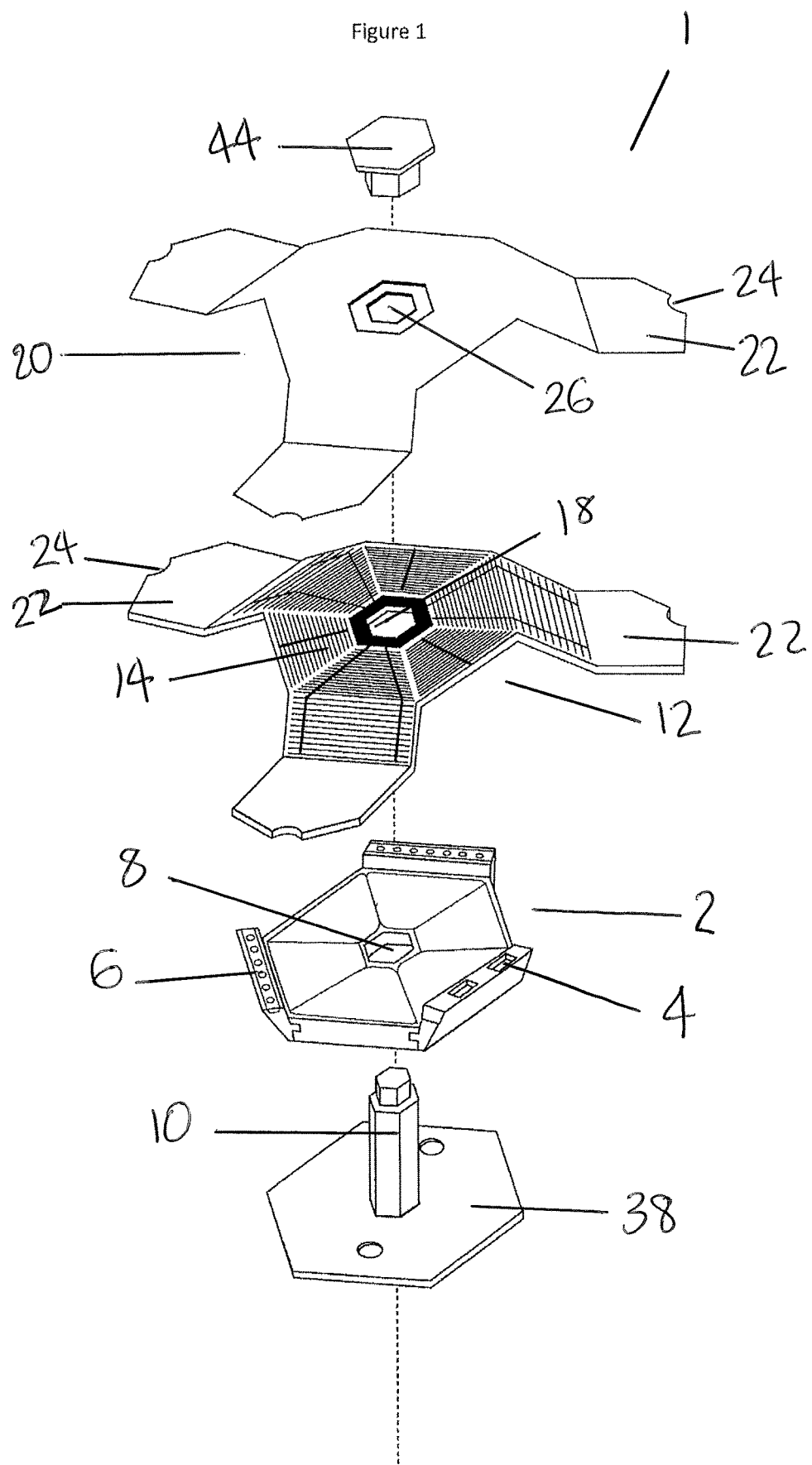
FIG. 1 depicts an exploded view of an apparatus according to the invention.

In FIG. 1, an apparatus 1 according to the invention having a third layer 2 is shown. In this embodiment, the apparatus 1 is hexagonally shaped. The third layer 2 comprises a lithium battery power storage facility and a supercapacitor (all not shown) all within it. Visible are a power indicator, which is in the form of a digital display screen 4, which indicates how much power is actually being stored in the third layer at any given time; and a number of red, yellow and green LED indicators 6, which also provide an indication of much power is actually being stored in the first layer. If none of the LED indicators 6 are lit, then there is no or minimal power stored; if only the red light is lit then there is a little power stored, and so on. The more lights that are lit, the more power there is stored in the third layer 2.

The third layer 2 also comprises an opening 8 in the centre thereof, through which the connecting member 10 is able to be inserted.

Underneath the third layer is a base layer 38, which comprises holes 40 through which securing members such as bolts or screws may be used to secure the apparatus 1 to a surface. The connecting member 10 is secured to the base layer 38. The third layer 2 sits upon the base layer 38 in this embodiment.

The second layer 12 is shown in FIG. 1 as comprising a solar panel 14 as the power generating source. As with the third layer 2, the second layer 12 also comprises an opening 18 in the centre thereof, through which the connecting member 10 is able to be inserted.

The second layer 12 further comprises a number of protrusions 22 which are used to aid in interconnecting adjacent apparatuses 1. In this hexagonally shaped embodiment, there are there protrusions 22, which are located on alternate edges of the second layer 12. Each of the protrusions 22 also includes a semi-circular recess 24 at the end thereof. When in use, and when two or more apparatuses 1 are positioned adjacent each other, the semi-circular recess 24 of two separate apparatuses 1 will be positioned around the connecting member 10, holding the respective apparatuses 1 in position The first layer 20 is a sheet of a material which permits the second layer 12 to be exposed in some form to the elements which are the source of the power generated, e.g. the sun or water; and which is sufficiently sturdy to be walked upon without the material fracturing or breaking. The first layer 20 also comprises a number of protrusions 22 which are used to aid in interconnecting adjacent apparatuses 1. In this hexagonally shaped embodiment, there are there protrusions 22, which are located on alternate edges of the first layer 20. Each of the protrusions 22 also includes a semi-circular recess 24 at the end thereof. When in use, and when two or more apparatuses 1 are positioned adjacent each other, the semi-circular recess 24 of two separate apparatuses 1 will be positioned around the connecting member 10, holding the respective apparatuses 1 in position.

As with the third layer 2 and the second layer 12, the first layer 20 also comprises an opening 26 in the centre thereof, through which the connecting member 10 is able to be inserted.

Finally, a securing device 44 is placed on top of the connecting member 10 to secure all of the layers in place.

The connecting member 10 is equipped with an LED light, which can act as emergency lighting if necessary.

Figure 2:
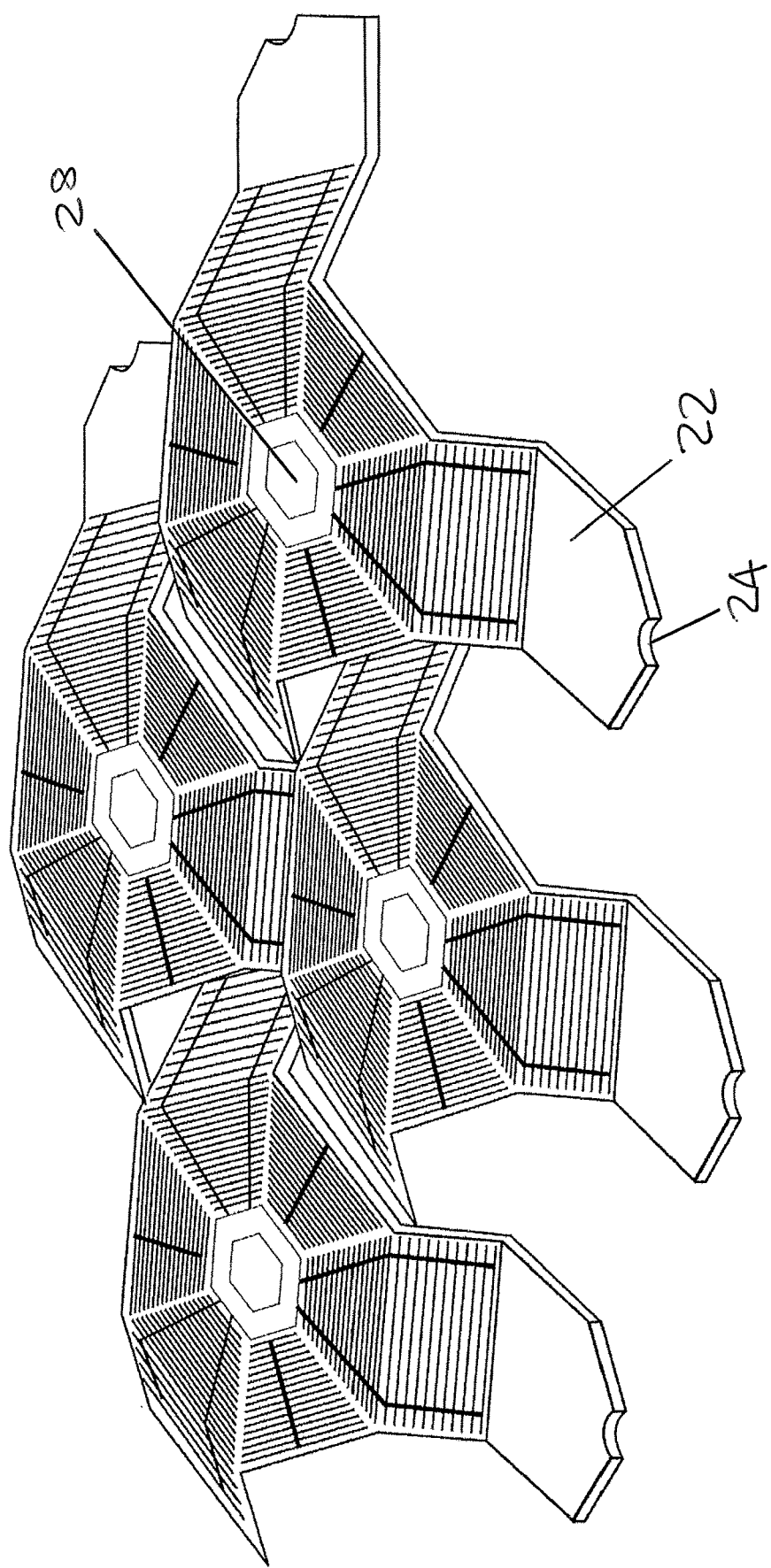
FIG. 2 depicts a perspective pictorial view of the apparatus of the invention.

In FIG. 2, a view of an array of hexagonal interconnected apparatuses 1 of the invention is depicted, showing how the array can appear in practice, with the first and second layers 12 and 20 clearly shown overlaying the third layer (not shown) and having the three protrusions 22 at alternate edges of the first layer 20 for engagement with the adjacent apparatuses in the array. Central in the apparatus is the connecting member 10, which is equipped with an LED light 28.

Figure 3:
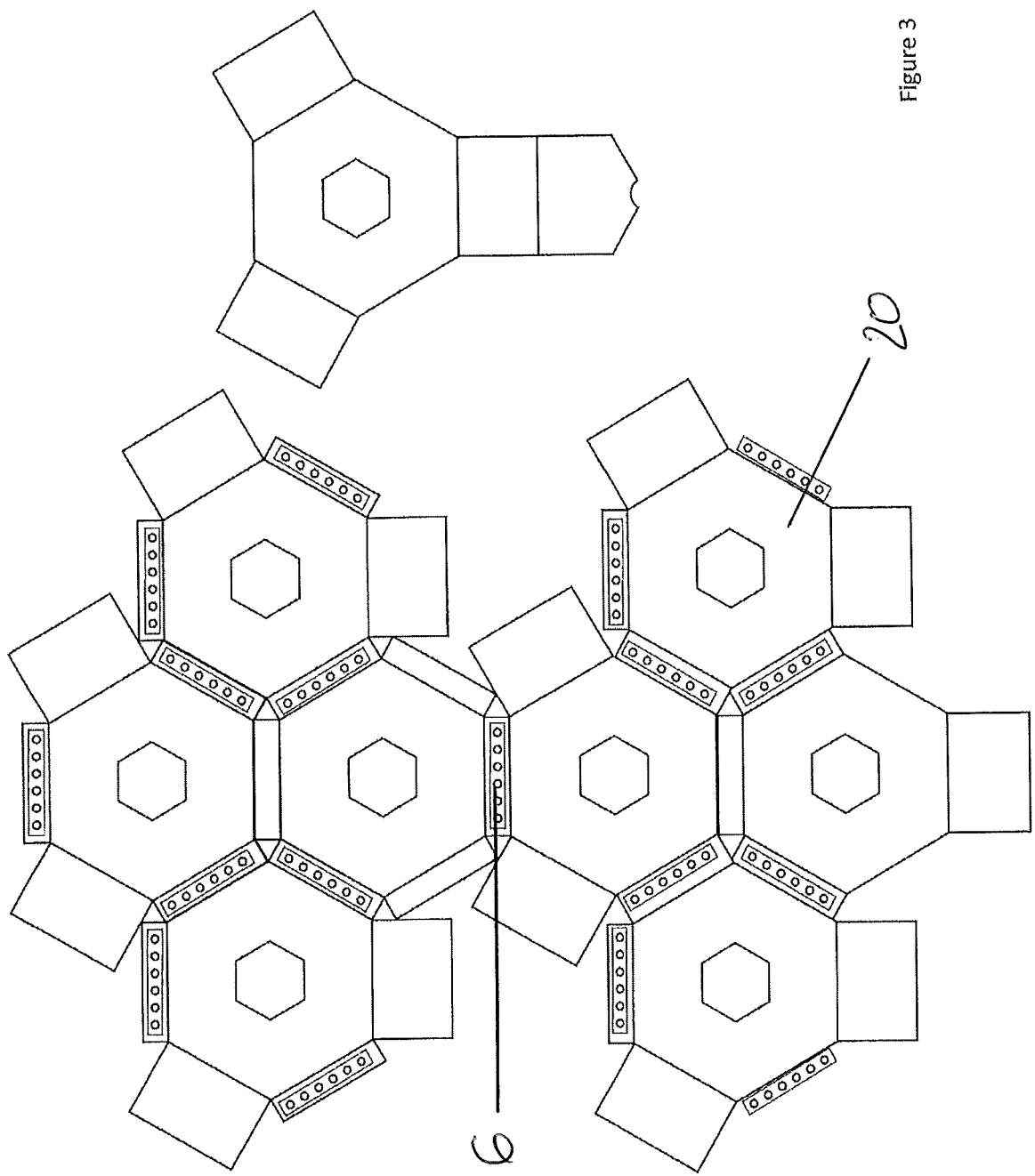
FIG. 3 depicts an overhead pictorial view of a plurality of apparatuses of the invention in an interconnected array.

In FIG. 3, an overhead view of an array of hexagonal interconnected apparatuses 1 of the invention is depicted, showing how the array can appear in practice, with the LED lights 6 visible in between the visible first layers 20.

Figure 4:
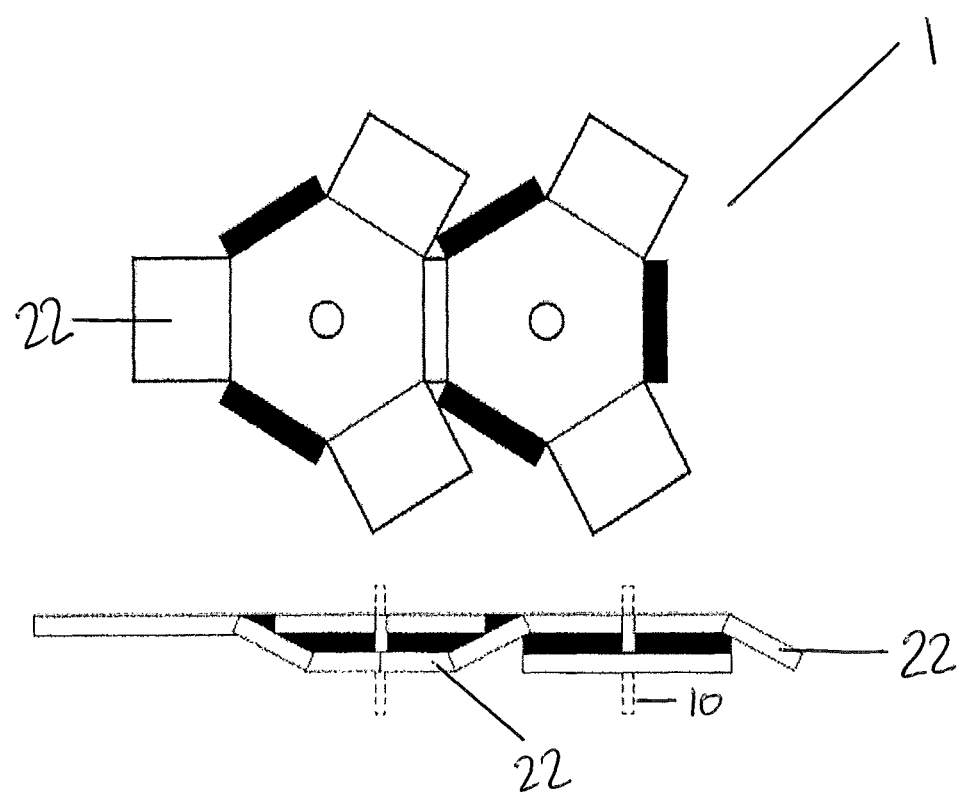
FIG. 4 depicts overhead and side views of two apparatuses of the invention interconnected with each other.

FIG. 4 shows overhead and side views of how two apparatuses 1 of the invention interconnect with each other. In the overhead figure, it can be seen that a protrusion 22 extends from the first layer 20 of the right hand apparatus underneath the left right hand apparatus. Underneath the left right hand apparatus, the protrusion 22 engages with the connecting member 10 and the semi-circular recess 24 (not shown) of the protrusion 22 is positioned around the connecting member 10, as shown in the side-view figure.

Figure 5:
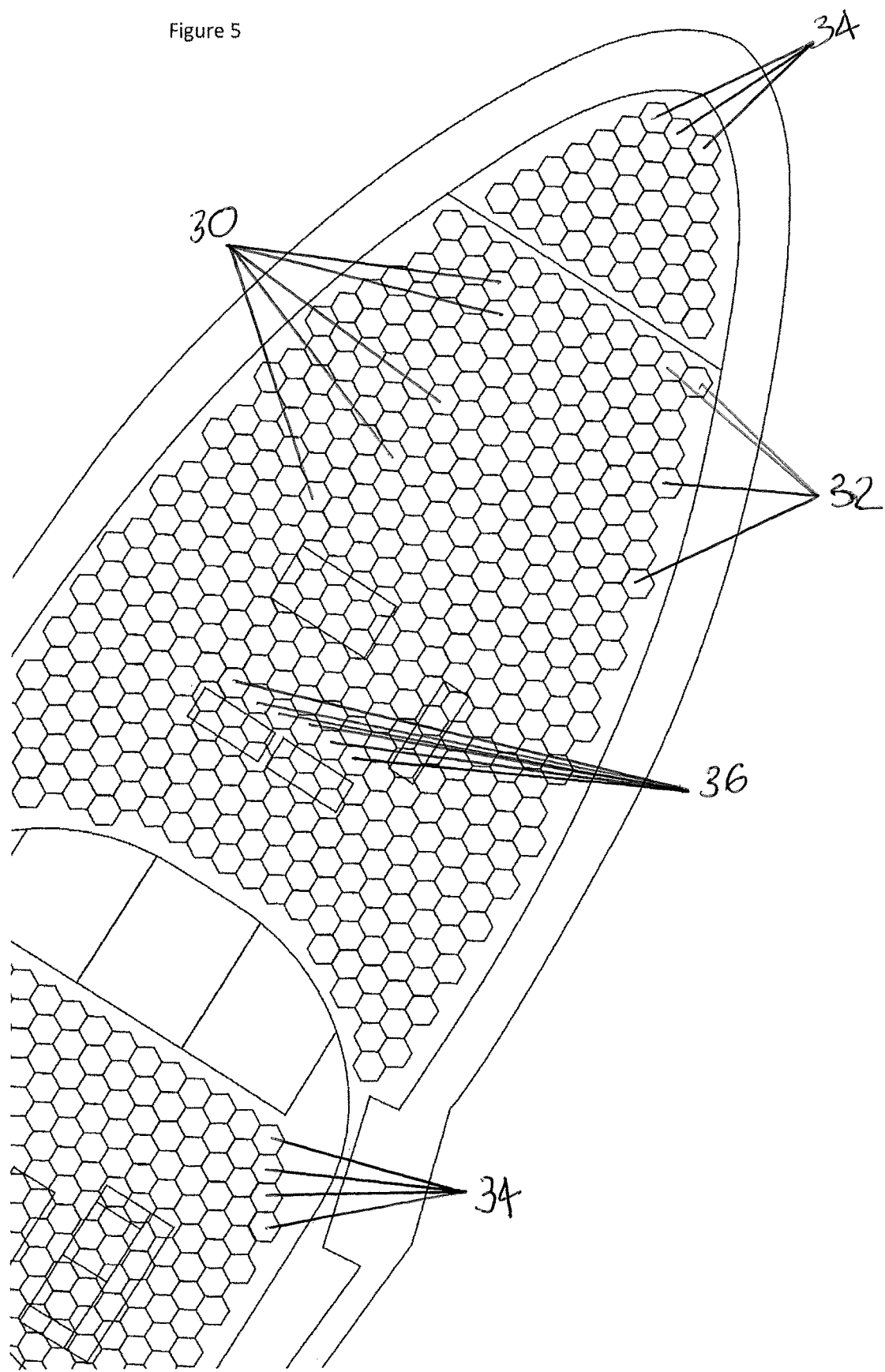
FIG. 5 depicts an overhead view of a marine vessel comprising a plurality of apparatuses of the invention on its deck and cabin roof.

FIG. 5 shows how a marine vessel may be equipped with an array of multiple apparatuses of the invention, both on its deck and cabin roof. The majority of the apparatuses are purely solar power generating apparatuses 30, and do not contain an LED light 28 as a part of the connecting member 10. Many of the apparatuses 32 around the perimeter contain a yellow light LED as a part of the connecting member 10, to provide lighting on deck. Some of the apparatuses 34 in the corners and at the front of the vessel contain a red light LED as a part of the connecting member 10, to provide emergency lighting. Finally, there are a number of apparatuses 36 which are positioned approximately centrally on the deck, which are power panels. The power panels are intended as power sources for people on the surface, and will typically comprise plug or USB sockets, enabling, for example, phones and tablets to be charged.

It is of course to be understood that the present invention is not intended to be restricted to the foregoing examples which are described by way of example only.

The invention claimed is:

1. An apparatus for the capture and storage of power, the apparatus comprising:
   i) a first layer comprising a protective layer, comprising one or more protrusions that enable two or more apparatuses to interconnect with each other;
   ii) a second layer engaged with the first layer, the second layer comprising a device that is able to generate power from exposure to its environment, and one or more protrusions that enable two or more apparatuses to interconnect with each other;
   iii) a third layer engaged with the second layer, the third layer comprising a power storage facility; and
   iv) a fourth layer engaged with the third layer, the fourth layer comprising a power grid which enables power to be transferred between interconnected apparatuses; wherein the first layer, second layer, third layer, and fourth layer are secured together using a connecting member inserted through an opening in the first layer, second layer, third layer, and fourth layer; and
   wherein the one or more protrusions on each of the first and second layers avow draw and transfer of power between the interconnected apparatuses when interconnected in an array.

2. An apparatus according to claim 1, wherein the power storage facility is a battery, and comprises graphene or a derivative thereof.

3. An apparatus according to claim 1, wherein the second layer comprises one or more solar panels.

4. An apparatus according to claim 1, wherein the second layer comprises a hydrogen fuel cell.

5. An apparatus according to claim 1, wherein the apparatus is in the form of a removable tile or panel.

6. An apparatus according to claim 1, wherein the connecting member contains a light source.

7. An apparatus according to claim 1, wherein the connecting member contains a sensor to monitor levels of energy that are stored and/or used.

8. An array comprising a plurality of apparatuses according to claim 1 interconnected with each other.

9. A marine vessel, comprising one or more apparatuses according to claim 1.

10. A method of generating and storing power comprising employing one or more apparatuses according to claim 1.

11. Use of one or more apparatuses according to claim 1, in the generation and storage of power.

12. An apparatus according to claim 1, wherein the one or more protrusions on each of the first and second layers comprise a conductive matting material.

* * * * *